United States Patent
Mayer et al.

(10) Patent No.: US 10,459,505 B2
(45) Date of Patent: Oct. 29, 2019

(54) BATTERY VIRTUALIZATION

(71) Applicants: Michael Mayer, Ottawa (CA); Mehdi Arashmid Akhavain Mohammadi, Ottawa (CA)

(72) Inventors: Michael Mayer, Ottawa (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 15/495,096

(22) Filed: Apr. 24, 2017

(65) Prior Publication Data
US 2018/0307292 A1 Oct. 25, 2018

(51) Int. Cl.
*G06F 1/3212* (2019.01)
*G06F 1/3287* (2019.01)
(Continued)

(52) U.S. Cl.
CPC ........... *G06F 1/3212* (2013.01); *G06F 1/329* (2013.01); *G06F 1/3265* (2013.01); *G06F 1/3287* (2013.01); *G06F 1/3296* (2013.01); *G06F 9/45558* (2013.01); *H02J 7/027* (2013.01); *H02J 9/002* (2013.01); *H02J 9/005* (2013.01);
(Continued)

(58) Field of Classification Search
CPC ........ G06F 1/26; G06F 1/3206; G06F 1/3212; G06F 1/329; G06F 3/04847; G06F 9/5088; G06F 9/5094; G06F 1/3287; G06F 2009/45579; G06F 9/45558; G06F 12/0804; G06F 1/30; G06F 1/3203; G06F 1/3228; G06F 1/324; G06F 1/3265; G06F 1/3296; G06F 2212/60; G06F 9/442; Y02D 10/174; Y02D 10/24; H01M 10/42; H02J 7/0068; H02J 2007/005; H02J 7/0047; H02J 7/027; H02J 9/002; H02J 9/005; H04M 1/72544; H04M 1/72547; H04W 52/0264
See application file for complete search history.

(56) References Cited

U.S. PATENT DOCUMENTS

2010/0023940 A1* 1/2010 Iwamatsu ............ G06F 1/3203
   718/1
2015/0019889 A1* 1/2015 Banerjee ............... G06F 1/3206
   713/320
(Continued)

FOREIGN PATENT DOCUMENTS

CN 103685759 A 3/2014
CN 106155252 A 11/2016
(Continued)

*Primary Examiner* — Terrell S Johnson

(57) ABSTRACT

A method of controlling a computing device including a physical battery and at least one group of applications executable on hardware resources of the computing device, each group including one or more applications. The method comprises controlling each group of applications based on a state of a respective virtual battery associated each group of applications, each virtual battery having a respective virtual capacity corresponding to a defined portion of a capacity of the physical battery and a respective virtual battery reserve representing an amount of energy that is available for use by the group of applications associated with the virtual battery.

24 Claims, 4 Drawing Sheets

(51) Int. Cl.
    *G06F 9/455*      (2018.01)
    *G06F 1/3234*     (2019.01)
    *G06F 1/329*      (2019.01)
    *G06F 1/3296*     (2019.01)
    *H02J 7/02*       (2016.01)
    *H02J 9/00*       (2006.01)
    *H02J 7/00*       (2006.01)

(52) U.S. Cl.
    CPC ... *G06F 2009/45579* (2013.01); *H02J 7/0047* (2013.01); *H02J 2007/005* (2013.01)

(56) References Cited

U.S. PATENT DOCUMENTS

2015/0323974 A1* 11/2015 Shuster .............. H04M 1/72563
                                                    713/320
2016/0070326 A1*  3/2016 Hsiao ................ G06F 1/3203
                                                    713/320
2016/0255531 A1*  9/2016 Stein ................. G06F 1/1632
                                                    455/575.1

FOREIGN PATENT DOCUMENTS

CN      106572516 A    4/2017
WO     2013133845 A1   9/2013

* cited by examiner

BATTERY VIRTUALIZATION

FIELD OF THE INVENTION

The present invention pertains to the field of energy storage and management, and in particular to battery virtualization.

BACKGROUND

For the purposes of this disclosure the term "battery" shall be understood to refer to a device capable of storing a finite amount of energy (in any suitable form) and releasing stored energy in the form of electrical power. Examples of a battery include an electrochemical cell, a capacitor, an energy storage fly-wheel, and a fuel cell or a generator with a finite fuel supply. The amount of energy stored in the battery may be described in any suitable manner, such as, for example, Joules (J), British Thermal Units (BTU), Amp-hours (Ah) or milli-Amp-Hours (mAh).

FIG. 1 illustrates a simple battery. In the example of FIG. 1, the battery 100 comprises an energy store (or storage) 102 and a controller 104. Examples of an energy store 102 include an electrochemical cell, a capacitor, an energy storage fly-wheel, and a fuel cell or a generator with a finite fuel supply. The amount of energy stored in the energy store 102 may be described in any suitable manner, such as, for example, Joules (J), British Thermal Units (BTU), Amp-hours (Ah) or milli-Amp-Hours (mAh).

In its simplest form, the controller 104 may be provided as a switch that can be used to selectively connect the energy store 102 to a load 106 through a suitable conductor 108. When this connection is made, the energy store is discharged (at 110) to supply electrical energy to the load 106. In more complex examples, the controller 104 may provide electrical power conditioning circuits such as voltage regulators, rectifiers or inverters and the like to ensure that the electrical power supplied to the load 106 from the energy store 102 is suitable for use by the load 106. In addition, the controller 104 may include circuitry configured to enable the energy store 102 to be recharged (as shown at 112).

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide architectural options for controlling battery utilization in a computing device.

Accordingly, a first aspect of the present invention provides a method of controlling a computing device including a physical battery and at least one group of applications executable on hardware resources of the computing device, each group including one or more applications. The method comprises controlling each group of applications based on a state of a respective virtual battery associated each group of applications, each virtual battery having a respective virtual capacity corresponding to a defined portion of a capacity of the physical battery and a respective virtual battery reserve representing an amount of energy that is available for use by the group of applications associated with the virtual battery.

In an embodiment of the first aspect of the present invention, the method further comprises instantiating a virtual battery manager associated with each group of applications, the virtual battery manager being configured to control the respective group of applications based on the state of the respective virtual battery. In another embodiment, each group of applications is executed in a respective virtual machine, and where optionally, each virtual machine is associated with a virtual battery manager configured to control the respective group of applications based on the state of the respective virtual battery.

In another embodiment, the virtual capacity of a given virtual battery is calculated based on any one or more of an estimated battery utilization of the respective group of applications; a priority of the respective group of applications; and a user input.

In another embodiment, the virtual capacity of a given virtual battery is fixed during a runtime of the respective group of applications. In another embodiment, the virtual capacity of a given virtual battery is variable during a runtime of the respective group of applications, and optionally the method can include a calculating an updated virtual capacity of the given virtual battery during a runtime of the respective group of applications, where in further optional embodiments, the updated virtual capacity is calculated based on an actual battery utilization of the respective group of applications.

In another embodiment, each group of applications based on a state of the respective virtual battery comprises: detecting a low-battery state of a particular virtual battery, and in response to detection of the low battery state, performing any one or more of: shutting down one or more applications of the respective group of applications associated with the particular virtual battery; and restricting access, by one or more applications of the respective group of applications associated with the particular virtual battery, to hardware resources of the computing device. In another embodiment, detecting the low battery state comprises: calculating an estimate of the battery utilization of the respective group of applications; and decreasing a value of the respective virtual battery reserve of the particular virtual battery based on the calculated estimate of the battery utilization. In a further embodiment, detecting the state of a particular virtual battery further comprises increasing the virtual battery reserve of the particular virtual battery when the energy currently stored in the physical battery is increasing. In another embodiment, increasing the energy remaining in the particular virtual battery is based on any one or more of: a rate at which the energy currently stored in the physical battery is increasing; the virtual capacity of the particular virtual battery; a priority of the respective group of applications associated with the particular virtual battery; and a user input. In a further embodiment, detecting a low-battery state of the particular virtual battery comprises any one or more of: detecting that the virtual battery reserve of the particular virtual battery is equal to or less than a predetermined threshold; and detecting that the virtual battery reserve of the particular virtual battery is predicted to fall below the predetermined threshold within a defined future period of time.

In a second aspect of the present invention, there is provided a computing device comprising a physical battery having a defined battery capacity; hardware resources comprising a memory and processor; at least one group of applications, resident within the memory and executable by the processes. Each group of applications including one or more applications executable on the hardware resources. The computing device further comprising a virtual battery manager, resident within the memory and when instantiated by the processor on the hardware resources, configured to control each group of applications based on a state of the respective virtual battery associated each group of applications, each virtual battery having a respective virtual capacity corresponding to a defined portion of a capacity of the physical battery and a respective virtual battery reserve representing an amount of energy that is available for use by the group of applications associated with the virtual battery.

In an embodiment of the second aspect of the present invention, each group of applications is executed in a respective virtual machine, and optionally each virtual machine is associated with a virtual battery manager configured to control the respective group of applications based on the state of the respective virtual battery. In another embodiment, the virtual capacity of a given virtual battery is calculated based on any one or more of: an estimated battery utilization of the respective group of applications; a priority of the respective group of applications; and a user input. In another embodiment, the virtual capacity of a given virtual battery is either fixed during a runtime of the respective group of applications or variable during a runtime of the respective group of applications. In another embodiment, the virtual battery manager is configured to control each group of applications by: detecting a low-battery state of the respective virtual battery, and in response to detection of the low battery state, performing any one or more of: shutting down one or more applications of the respective group of applications associated with the virtual battery; and restricting access, by one or more applications of the respective group of applications associated with the virtual battery, to the hardware resources. In a further embodiment, detecting the low battery state comprises: calculating an estimate of the battery utilization of the respective group of applications; and decreasing a value of the respective virtual battery reserve of the particular virtual battery based on the calculated estimate of the battery utilization. In another embodiment, detecting the state of the respective virtual battery further comprises increasing the virtual battery reserve of the respective virtual battery when the energy currently stored in the physical battery is increasing. In another embodiment, increasing the virtual battery reserve of the respective virtual battery is based on any one or more of: a rate at which the energy currently stored in the physical battery is increasing; the virtual capacity of the respective virtual battery; a priority of the respective group of applications associated with the respective virtual battery; and a user input. In a further embodiment, detecting a low-battery state of the respective virtual battery comprises any one or more of: detecting that the virtual battery reserve of the respective virtual battery is equal to or less than a predetermined threshold; and detecting that the virtual battery reserve of the respective virtual battery is predicted to fall below the predetermined threshold within a defined future period of time.

Those skilled in the art will appreciate that the above described embodiments of the different aspects may be applied to the aspect with which they are described in relation to, alone or in combination with other embodiments, and in some situations they may be applied to other aspects. Those skilled in the art will appreciate that some embodiments may be mutually exclusive, in which case they would not be considered to be combinable as noted above.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
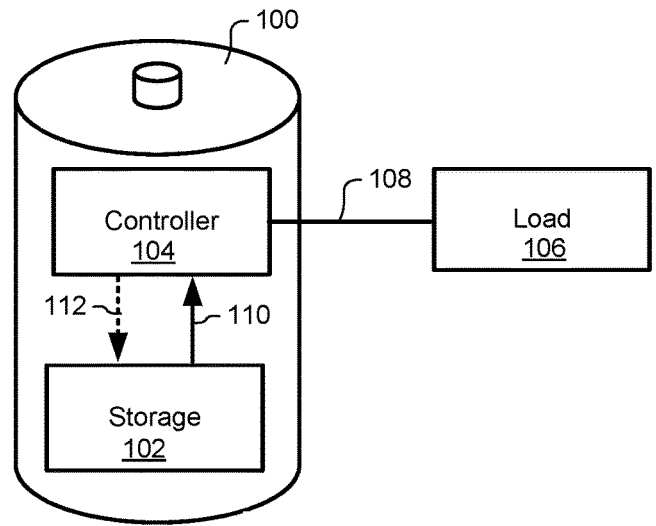
FIG. 1 is a block diagram of a conventional battery system.
Figure 2:
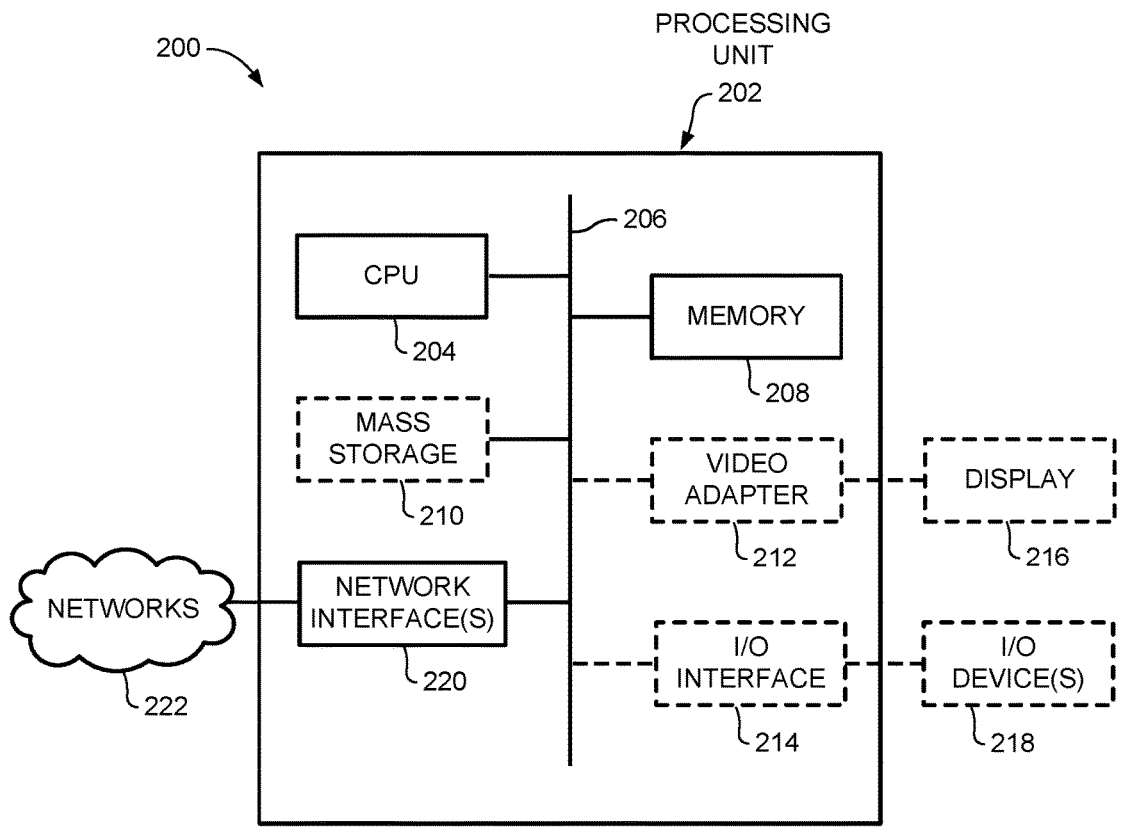
FIG. 2 is a block diagram of a computing system 100 that may be used for implementing devices and methods in accordance with representative embodiments of the present invention.

FIG. 2 is a block diagram of a computing system 200 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 200 includes an electronic device (ED) 202. The ED 202 typically includes a central processing unit (CPU) 204, a bus 206 and a memory 208, and may optionally also include a mass storage device 210, a video adapter 212, and an I/O interface 214 (shown in dashed lines).

The CPU 204 may comprise any type of electronic data processor. Thus the CPU 204 may be provided as any suitable combination of: one or more general purpose microprocessors and one or more specialized processing core such as Graphic Processing Units (GPUs) or other so-called accelerated processors (or processing accelerators). The memory 208 may comprise any type of non-transitory system memory such as static random access memory (SRAM), dynamic random access memory (DRAM), synchronous DRAM (SDRAM), read-only memory (ROM), or a combination thereof. In an embodiment, the memory 208 may include ROM for use at boot-up, and DRAM for program and data storage for use while executing programs. The bus 206 may be one or more of any type of several bus architectures including a memory bus or memory controller, a peripheral bus, or a video bus.

The mass storage 210 may comprise any type of non-transitory storage device configured to store data, programs, and other information and to make the data, programs, and other information accessible via the bus 206. The mass storage 210 may comprise, for example, one or more of a solid-state drive, hard disk drive, a magnetic disk drive, or an optical disk drive.

The optional video adapter 212 and the I/O interface 214 may be used to provide interfaces to couple external input and output devices to the processing unit 202. Examples of input and output devices include a display 216 coupled to the video adapter 212 and an I/O device 218 such as a touchscreen coupled to the I/O interface 214. Other devices may be coupled to the processing unit 202, and additional or fewer interfaces may be utilized. For example, a serial interface such as Universal Serial Bus (USB) (not shown) may be used to provide an interface for an external device.

The processing unit 202 may also include one or more network interfaces 220, which may comprise wired links, such as an Ethernet cable, and/or wireless links to access one or more networks 222. The network interfaces 220 allow the processing unit 202 to communicate with remote entities via the networks 222. For example, the network interfaces 220 may provide wireless communication via one or more transmitters/transmit antennas and one or more receivers/receive antennas. In an embodiment, the processing unit 202 is coupled to a local-area network or a wide-area network for data processing and communications with remote devices, such as other processing units, the Internet, or remote storage facilities.

Figure 3:
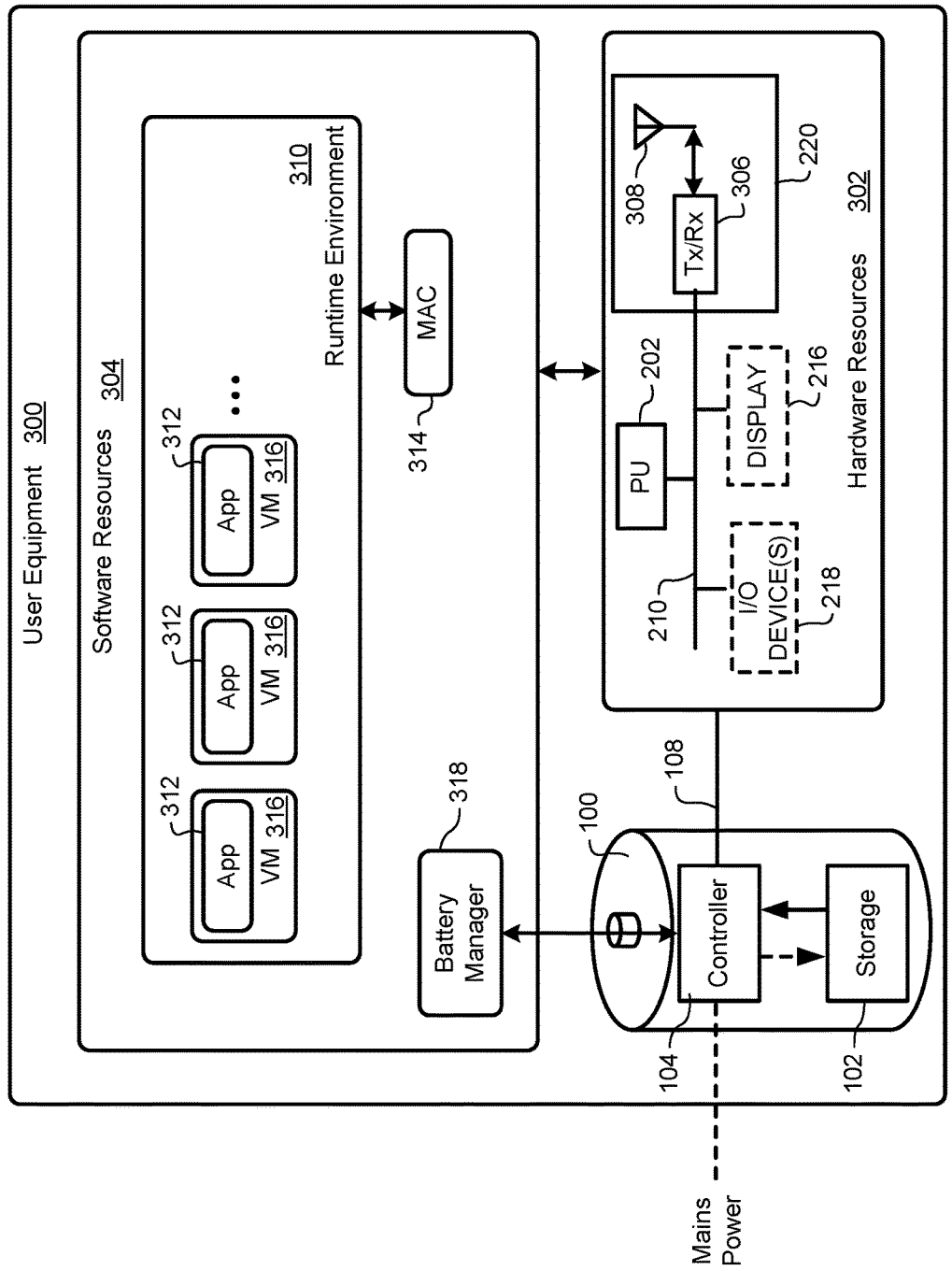
FIG. 3 is a block diagram schematically illustrating a functional architecture of a representative User Equipment (UE)

FIG. 3 is a block diagram schematically illustrating a functional architecture of a representative Electronic Device, such as User Equipment (UE) 300. An Electronic Device may be embodied as a mobile phone, tablet computer or the like, it may be a conventional UE, while in other embodiments it may be a machine type communication (MTC) device. In the example of FIG. 3, the UE 300 is broadly composed of hardware resources 302 and software resources 304. The hardware resources 302 may implemented as one or more processors (any or all of which may be constructed in accordance with the system 200 described above with reference to FIG. 2). The UE 300 may connect to a network 222 through the use of one or more different radio access technologies (RATs) and standards. The execution of suitable software may enable the processor to control the radio access elements (such as, for example, a transceiver 306 and an antenna 308) of the UE 300 to connect using different RATs to perform its intended function when connected. Those of ordinary skill will recognize that there are many suitable combinations of hardware and software that may be used for the purposes of the present invention, which are either known in the art or may be developed in the future. For this reason, a figure showing the physical UE hardware is not included in this specification. Rather, the block diagram of FIG. 3 shows a representative functional architecture of a UE 300, it being understood that this functional architecture may be implemented using any suitable combination of hardware and software.

As maybe seen in FIG. 3, the illustrated UE 300 generally comprises a Runtime Environment (RE) 310 that may provide a flexible and efficient multi-tenancy run-time and hosting environment for applications 312, a Media Access Control (MAC) function 314 for managing the transmission of packets using the transceiver 306 and antenna 308. The RE 310 may provide a security and resource "sandbox" for each application 312 being hosted by the UE 300. Each "sandbox" may be implemented as a Virtual Machine (VM) 316 that includes an operating system instance and controlled access to the hardware resources 302 of the UE 300. It will be understood by those skilled in the art that RE 310 may be provided by a hypervisor executed on the hardware resources 302 of UE 300. In other embodiments, in place of VM 316, different functional components can be implemented as software containers running atop a common OS kernel, a technique also referred to as OS-level virtualization. Container based virtualization does not typically require the instantiation of a virtual machine to provide the resource isolation that is typically provided by a VM.

Applications 312 from vendors, service providers, and third-parties may be deployed and executed within a respective Virtual Machine 316 or another suitable container. For example, messaging, video streaming and location-based-services may be implemented by means of one or more applications 312 hosted on the RE 310 as described above.

It should be understood that within a single VM 316 a plurality of applications can be supported. Communication between applications 312 and a network 222 will typically be implemented as a service of the RE 310 using the MAC function 314 and one or more Radio Access Technologies (RATs) that are supported the UE 300. These Radio Access Technologies (RATs) may include any one or more of Long Term Evolution (LTE), High Speed Packet Access (HSPA) Global System for Mobile communication (GSM), Enhanced Data rates for GSM Evolution (EDGE), WiFi and Bluetooth as well as successor RATs to those listed above. It is anticipated that further RATs will be developed in the future.

Operation of UE 300 is dependent on the supply of sufficient electrical power to the hardware resources 302. This supply of electrical power is provided by a battery 100 via electrical conductor 108. In a typical UE 300, the battery's energy store 102 is provided as one or more electrochemical cells. The controller 104 will normally be provided with switching circuitry to enable the energy store 102 to be recharged from a mains power supply (e.g. via a suitable electrical cable, not shown). In addition, the controller 104 may be provided with power conditioning circuits (not shown) such as a voltage regulator and monitoring circuits (not shown) for detecting various data about the status of the battery 100. Example monitoring circuits that include a voltage sensor that detects a total voltage across the energy store 102, and a current sensor that detects a total electrical current draw from the energy store 102. These detected values may be passed to a battery manager 318 and used to infer information about the state of the battery 100.

In some examples, the battery manager 318 may be provided as a service of the RE 310, or an underlying operating system of the UE 300. In other examples, the battery manager 318 may be provided as an application 312 executing in a VM 316 hosted by the RE 310. Typically, the battery manager 318 operates to display (eg. On a display 216 of the UE 300) an indication of the amount of energy remaining in the energy store 102. In some cases, the battery manager 318) may provide more sophisticated operations such as calculating an estimate of time remaining to exhaust the energy in the energy store 102. In some cases, the battery manager 318 may interact with the RE 310 (or an underlying operating system of the UE 300) to implement a "battery saving" mode of operation, in which the power supplied to some of the hardware resources 302 may be reduced. For example, the maximum power supplied to the processor 202 may be limited, which will limit the speed of the processor 202. This will tend to reduce the performance of an applications 312 executing on the UE 300, but will also extend the time remaining to exhaust the energy in the energy store 102. In another example, the brightness of the display 216 may be reduced to conserve energy and so extend the time remaining to exhaust the energy in the energy store 102. Both of these techniques will inherently affect all of the applications 312 executing in the UE 300 in substantially the same manner.

It would be desirable to have further options for controlling power consumption within the UE, particular in situations where the amount of energy remaining in the energy store 102 is relatively low. More broadly, it would be desirable to have further options for controlling battery utilization within any computing environment, such as UEs, Access Nodes such as base stations, network servers, Mobile Edge Computing (MEC) nodes or data centers for example. In that respect, it will be recalled that all nodes of a communication network are dependent on a supply of electrical power for their operation. In most cases, network nodes are connected to the mains power supply. However, in many cases, batteries (or other secondary power sources) are used to provide temporary power during an outage of the mains power. It is during these periods that battery utilization becomes important.

Figure 4:
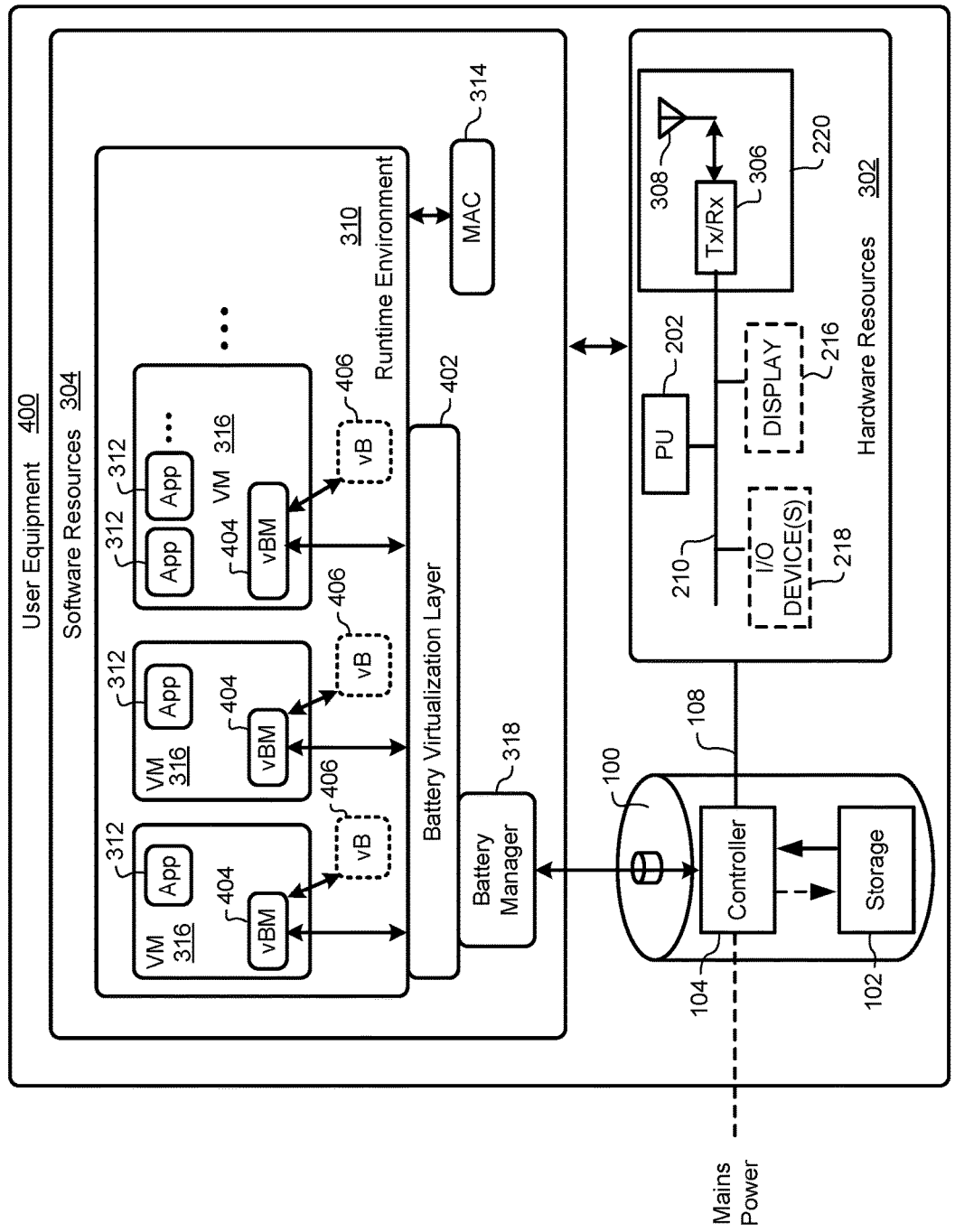
FIG. 4 is a block diagram schematically illustrating the User Equipment (UE) incorporating battery virtualization in accordance with an embodiment of the present invention.

In accordance with the present invention, battery utilization may be controlled by means of a battery virtualization layer instantiated with the runtime environment (or hypervisor) and a virtual battery manager instantiated within each virtual machine. In very general terms, the battery virtualization layer is configured to estimate the battery utilization of each application (or group of applications), and provides this information to each virtual battery manager instance. Based on the information provided by the battery virtualization layer, a virtual battery manager may control the battery utilization of one or more of the applications. In effect, the physical battery has been replaced by one or more "virtual batteries", each of which is associated with one or more applications, such that battery utilization can be controlled on a per-application or a per-service basis, based on the evolving state of each of the virtual batteries. FIG. 4 illustrates an example in which battery virtualization in accordance with the present invention is applied to the UE 300 of FIG. 3.

For the purposes of the present description, it is convenient to consider that the physical battery has a defined capacity, which represents a maximum amount of energy that can be stored in the battery, and an amount of energy currently stored in the battery, which represents the amount of energy that is available for use by the UE 300. Similarly, it is useful to consider that a virtual battery has a defined virtual capacity, which represents a defined proportion of the capacity of the physical battery, and virtual battery reserve, which represents the amount of energy that is available for use by applications associated with the virtual battery.

Referring to FIG. 4, there is shown a UE 400 that includes a battery virtualization layer 402 associated with the battery manager 318 and a respective virtual Battery Manager (vBM) instance 404 associated with each virtual machine 316.

In some embodiments, the battery virtualization layer 402 may be provided as a service of the runtime environment 310 or hypervisor, or of an underlying operating system of the UE 400. In other embodiments, the battery virtualization layer 402 may be implemented as an application 312 executing in a virtual machine 316. In operation, the battery virtualization layer 402 may receive information of the state of the battery 100 from the battery manager 318, and information of hardware resources used by each application 312 from the runtime environment 310. For example, the battery virtualization layer 402 may receive information identifying a total current draw on the battery 100, a total energy currently stored in the battery 100, and a time remaining to deplete the battery from the battery manager 318. In specific example embodiments, a positive value of the total current draw may indicate that the battery 100 is being discharged, while a negative value of the total current draw may indicate that the battery 100 is being charged. The runtime environment 310 may provide information to the battery virtualization layer 402 such as, for example, a proportion of the processing capacity of the processor 202 being used by each application; a proportion of a display 216, an I/O device 218 and network interfaces 220 being utilized by each application. Alternatively, the battery virtualization layer 402 may receive information of hardware resources used by each VM 316 from the runtime environment 310. For example, the battery virtualization layer 402 may receive information identifying a proportion of the capacity of the processor 202, display 216, I/O device(s) 218 and network interface(s) 220 being utilized by each VM 316. Based on the received information, the battery virtualization layer 402 may calculate an estimate of the battery utilization of each application 312 (or VM 316). If desired, the battery virtualization layer 402 may calculate an updated estimate of the battery utilization of each application 312 (or VM 316) at regular intervals. These per-application (or per-VM) battery utilization estimates may then be passed by the battery virtualization layer 402 to each virtual battery manager 404.

In some embodiments, the battery utilization estimate(s) for a specific application 312 (or VM 316) may be passed only to the vBM 404 associated with the involved VM 316. Based on the battery utilization estimate(s) received from the battery virtualization layer 402, the vBM 404 may control operation of applications 312 executing within that vBM's virtual machine 316. For example, when a VM 316 is instantiated, its vBM 404 may be allocated a specific virtual capacity. During subsequent operation, the vBM 404 may use the battery utilization estimates from the battery virtualization layer 402 to deduct energy used by the applications 312 (or VM 316) from the allocated virtual capacity to calculate a remaining virtual battery reserve. When the remaining virtual battery reserve reaches a predetermined threshold, or is predicted to fall below the threshold within some predetermined future time period, the vBM 404 may detect a "low battery" state, and interact with the VM 316 to limit battery utilization of the applications 312 executing in the VM 316. For example, the vBM 404 may interact with the VM 316 to initiate a partial or complete shut-down of the applications 312 executing in the VM 316. In another example, the vBM 404 may interact with the VM 316 to limit access, by the applications 312 executing in the VM 316, to hardware resources 302 of the UE 300. For example, the VM 316 may interact with the RE 310 to reduce a proportion of the capacity of the processor 202 and network interface(s) 220 available for use by the applications 312 executing in the VM 316. In effect, the vBM 404 operates to control applications 312 executing in its VM 316 based on the state of a virtual battery 406 that is associated only with the VM 316 and which has a virtual capacity corresponding to the amount (or proportion) of physical battery capacity allocated to it at the time of instantiation of the VM 316.

As may be appreciated, battery virtualization as provided by the present invention may be used in a wide variety of ways. A selection of four example use cases is presented below:

Use Case 1: Staged Shutdown of Applications.

As noted above, a specific amount of physical battery capacity may be allocated to a vBM 404, for example when the vBM's virtual machine 316 is instantiated. This allocated physical battery capacity becomes the virtual capacity of the vBM's virtual battery 406, and the vBM 404 may trigger a shut-down of applications 312 executing within the VM 316 as the virtual battery reserve remaining in that virtual battery 406 approaches or falls (or is predicted to fall) below a predetermined threshold. This functionality can be used to trigger an organized, and staged shut-down of applications across all of the VM's 316 instantiated within the runtime environment 310. More particularly, of applications 312 executing within different VMs can be caused to shut down at different times, based on the respective amount of battery capacity allocated to each virtual battery 406.

For example, the specific virtual capacity of a given vBM 404 may be selected based on an expected current draw needed by the applications 312 executing in the VM 316. For example, the battery capacity allocated to a given virtual battery 406 may be calculated to enable an application (or group of applications) instantiated in the respective VM 316 to continue to execute on battery power for a defined period of time (e.g. 15 minutes) prior to shutting down. This situation may pertain to applications that do not need to continue running for an extended period of time on battery power, but which do need some time to save data or terminate a communications session before being shut down.

In another example, the amount of virtual capacity allocated to a given virtual battery 406 may be selected based on user input. For example, a user may desire a particular application to run on battery power for as long as possible. Alternatively, the user may desire to restrict a particular application to a defined proportion of the total capacity of the physical battery 100. Both of these options may be accommodated by providing a user interface enabling the user to enter a parameter indicating the proportion of the total capacity of the battery 100 that they wish to have allocated to each application (or group of applications), and then calculating the allocation of virtual capacity to the associated virtual battery 406. The parameter entered by the user may be any convenient measure of the battery capacity. For example, parameter entered by the user may be a percentage of the total capacity of the battery 100.

Use Case 2: Protection of Priority Applications.

Some applications 312 may be considered to be high priority, and so should be provided with power for as long as possible. For example, applications 312 associated with the provision of emergency services (such as 911 calls, for example) may be assigned a high priority, as these applications should be maintained in an operational condition for as long as possible. This may be accomplished by allocating a relatively larger proportion of the total capacity of the battery 100 to the virtual capacity of the associated virtual battery 406.

Conversely, some applications may be considered to be low priority, and so may be provided with battery power for relatively shorter period of time, especially in order to preserve higher priority applications. For example, applications 312 associated with the provision of entertainment services, such as Netflix™, for example, may be assigned a low priority, as these applications do not need to be maintained in operation, and can readily be restarted once mains power is restored. This may be accomplished by allocating a relatively small proportion of the total capacity of the battery 100 to the virtual capacity of the associated virtual battery 406.

Use Case 3: Service-Based Allocation of Battery Capacity.

Examples 1 and 2 above describe allocation of battery capacity on a per-application basis. Many network and data-center services rely on one or more applications executing on a UE 400. In this case, the set of one or more applications associated with a given service may be instantiated within a single VM 316. Consequently, the per-application examples provided above may also be applied to services, which can therefore be maintained and/or shut down in a controlled manner, based on the proportion of physical battery capacity allocated to the virtual battery 406 associated with the VM 316 hosting the service's application(s).

Use Case 4: Slice-Specific Allocation of Battery Capacity.

For the purposes of this disclosure, a network "slice" (e.g. in one or more networks 222) is defined as a collection of one or more bearers (or PDU sessions) which are grouped together for some arbitrary purpose. This collection may be based on any suitable criteria such as, for example, business aspects (e.g. customers of a specific Mobile Virtual Network Operator (MVNO)), Quality of Service (QoS) requirements (e.g. latency, minimum data rate, prioritization etc.); traffic parameters (e.g. Ultra-Reliable Low Latency Communications (URLLC), Mobile Broadband (MBB), Machine Type Communication (MTC) etc.), or use case (e.g. machine-to-machine communication; Internet of Things (IoT), etc.).

It is possible to extend the concept of slicing to UE's and other network-connected computing devices (such as data centers, for example), by instantiating a respective VM 316 in association with each network slice. Applications supporting the PDU session(s) associated with the slice are then instantiated within that VM. Consequently, the per-application and per-service handling examples provided above may also be applied to network slices, which can therefore be maintained and/or shut down in a controlled manner, based on the proportion of the physical battery capacity allocated to the virtual battery 406 associated with the VM 316 hosting the slice's application(s).

For example, in some networking environments, it is desirable to use a UE as a relay to enable a second UE to connect to the network. PDU sessions associated with such relaying operations may be grouped together within a slice that is instantiated for that purpose. In this case, a VM 316 may be instantiated for the slice, and one or more applications used to support the relay operation may execute within that VM. Consequently, the per-application handling examples provided above may also be applied to slices, which can therefore be maintained and/or shut down in a controlled manner, based on the allocated virtual capacity of the associated virtual battery 406.

In another example, slicing may be used to enable a UE to establish and maintain two or more connections to the network. For example, the UE may establish a first connection for Ultra-Reliable Low Latency Communications (URLLC), a second connection for Mobile Broadband (MBB), and a third connection for Machine Type Communication (MTC). In order to enable each of these connections to be independently managed, each connection can be associated with a respective slice, and a respective VM 316 instantiated for each slice. Within each VM 316, one or more applications may be instantiated in each VM 316 to support the PDU sessions of the associated slice. The virtual capacity allocated to the virtual battery 406 of each VM/slice may be calculated based on an estimated utilization of each slice, so that PDU sessions of each slice can be properly supported while ensuring that the capacity of the physical battery 100 will not be monopolized by any one of the slices.

As may be appreciated, battery virtualization in accordance with the present invention improves the operation of the UE 400 (or, equivalently, provides a technical effect) by enabling high priority applications to be supported for as long as possible on battery power, by triggering early shut down of low-priority applications and an organized shut-down of all of the applications in the event that the physical battery 100 becomes exhausted (i.e. completely discharged).

In the examples described above, the virtual capacity of the (or each) virtual battery 406 is allocated at start-up (that is, when the corresponding VM 316 is instantiated) and does not change during the runtime of the application (or group of applications) associated with the VM 316. This is an example of hard (or fixed) battery capacity allocation. However, it will be appreciated that the allocation of battery capacity may be dynamic, insofar as that it may be adjusted during runtime. For example, consider the use case above, in which three VMs/slices are instantiated for hosting PDU sessions of URLLC, MBB and MTC connections, respectively. In that use case, each VM/slice is associated with a respective virtual battery 406, the capacity of which is determined based on the expected utilization of each of the three connection types. However, if the actual utilization of each of the three connection types is significantly different from the expected utilization, then the originally allocated capacity of each virtual battery 406 will not reflect the actual power requirements of each slice. In such a case, the battery virtualization layer 402 may identify one or more slices (or VMs) in which battery utilization is significantly higher or lower than expected, and calculate an updated virtual capacity allocation for each involved virtual battery 406. For example, the virtual capacity of the virtual battery 406 associated with an underutilized slice may be reduced, in order to increase the virtual capacity of the virtual battery 406 associated with another slice, such as an over-utilized slice.

Figure 5:
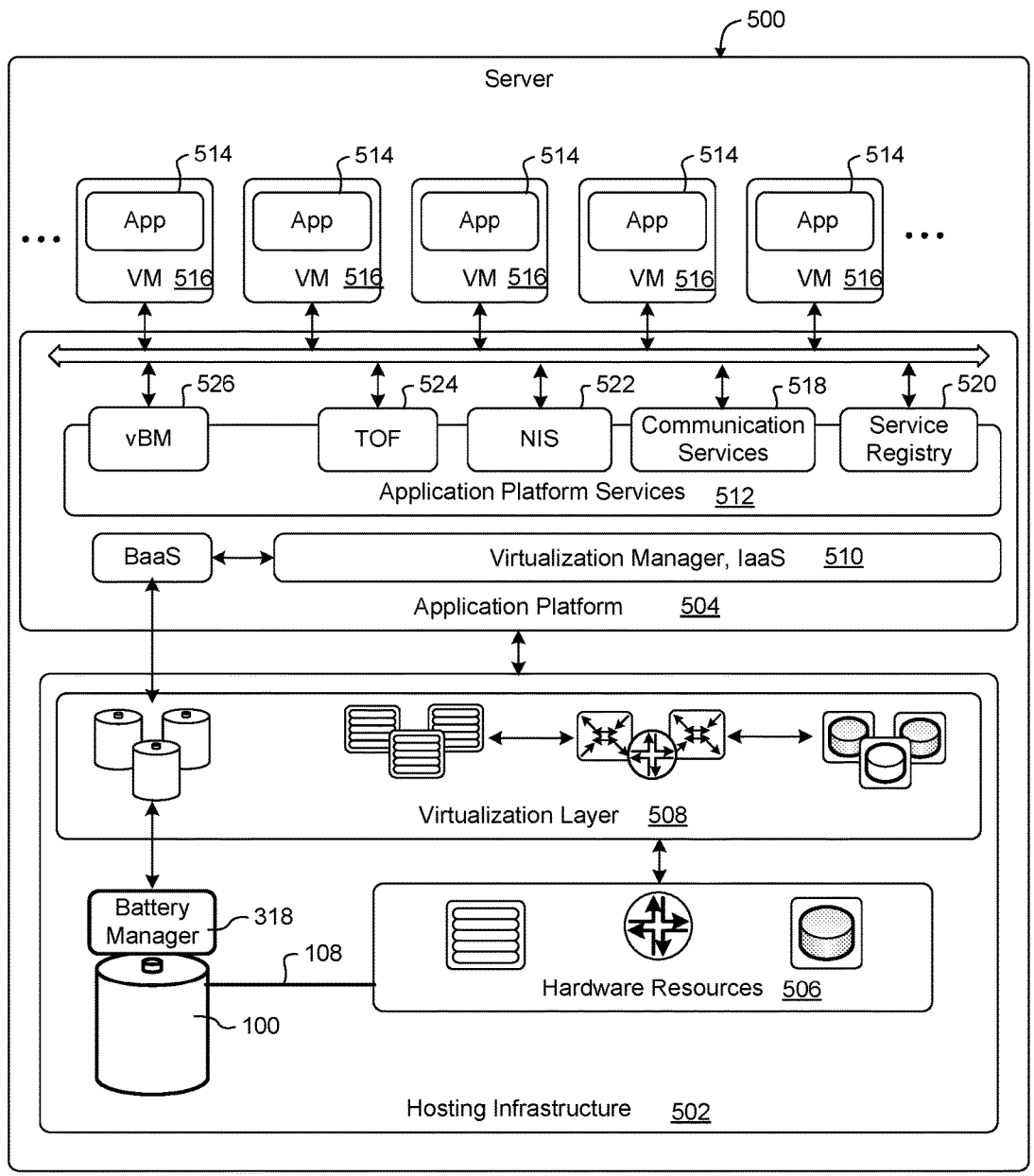
FIG. 5 is a block diagram schematically illustrating an architecture of a representative server usable in embodiments of the present invention.

In the examples described above, battery virtualization is described in the context of an electronic device in the form of a user equipment (UE) 400 such as a smart phone or a tablet PC. FIG. 5 illustrates an alternative embodiment, in which battery virtualization is implemented in a server, such as a network server, data center, or Mobile Edge Computing server.

FIG. 5 is a block diagram schematically illustrating an architecture of a representative server 500 implementing battery virtualization in accordance with a representative embodiment of the present invention. It is contemplated that the server 500 may be physically implemented as one or more computers, storage devices and routers (any or all of which may be constructed in accordance with the system 200 described above with reference to FIG. 2) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 5 shows a representative functional architecture of a server 500, it being understood that this functional architecture may be implemented using any suitable combination of hardware and software.

As maybe seen in FIG. 5, the illustrated server 500 generally comprises a hosting infrastructure 502 and an application platform 504. The hosting infrastructure 502 comprises the physical hardware resources 506 (such as, for example, information processing, traffic forwarding and data storage resources) of the server 500, and a virtualization layer 508 that presents an abstraction of the hardware resources 506 to the Application Platform 504. The specific details of this abstraction will depend on the requirements of the applications being hosted by the Application layer (described below). Thus, for example, an application that provides traffic forwarding functions may be presented with an abstraction of the hardware resources 506 that simplifies the implementation of traffic forwarding policies in one or more routers. Similarly, an application that provides data storage functions may be presented with an abstraction of the hardware resources 506 that facilitates the storage and retrieval of data (for example using Lightweight Directory Access Protocol—LDAP).

The application platform 504 provides the capabilities for hosting applications and includes a virtualization manager 510 and application platform services 512. The virtualization manager 510 supports a flexible and efficient multi-tenancy run-time and hosting environment for applications 514 by providing Infrastructure as a Service (IaaS) facilities. In operation, the virtualization manager 510 may provide a security and resource "sandbox" for each application being hosted by the platform 504. Each "sandbox" may be implemented as a Virtual Machine (VM) 516 that may include an appropriate operating system and controlled access to (virtualized) hardware resources 506 of the server 500. The application-platform services 512 provide a set of middleware application services and infrastructure services to the applications 514 hosted on the application platform 504, as will be described in greater detail below.

Applications 514 from vendors, service providers, and third-parties may be deployed and executed within a respective Virtual Machine 516. For example, Management and Orchestration (MANO) and Service Oriented Network Auto-Creation (SONAC), and its various functions such as Software Defined Topology (SDT), Software Defined Protocol (SDP), and Software Defined Resource Allocation (SDRA), may be implemented by means of one or more applications 514 hosted on the application platform 504 as described above. Communication between applications 514 and services in the server 500 may conveniently be designed according to the principles of Service-Oriented Architecture (SOA) known in the art.

Communication services 518 may allow applications 514 hosted on a single server 500 to communicate with the application-platform services 512 (through pre-defined Application Programming Interfaces (APIs) for example) and with each other (for example through a service-specific API).

A Service registry 520 may provide visibility of the services available on the server 500. In addition, the service registry 520 may present service availability (e.g. status of the service) together with the related interfaces and versions. This may be used by applications 514 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 522 may provide applications 514 with low-level network information. For example, the information provided by MS 522 may be used by an application 514 to calculate and present high-level and meaningful data such as: cell-ID, location of the subscriber, cell load and throughput guidance.

A Traffic Off-Load Function (TOF) service 524 may prioritize traffic, and route selected, policy-based, user-data streams to and from applications 514. The TOF service 524 may be supplied to applications 524 in various ways, including: A Pass-through mode where (uplink and/or downlink) traffic is passed to an application 514 which can monitor, modify or shape it and then send it back to the original Packet Data Network (PDN) connection (e.g. 3GPP bearer); and an End-point mode where the traffic is terminated by the application 514 which acts as a server.

In the context of a server 500, such as a network server, data center, or Mobile Edge Computing server, power for normal operations will be provided from the mains power supply, and the physical battery 100 will be used as an emergency power supply in the event of an outage of the mains power. In such a case, the battery 100 may be provided as a plurality of electrochemical cells, a fuel cell, an electric generator, or a combination of these.

In accordance with the present invention, the functional architecture of the server 500 described above may be extended to provide virtualized battery functionality to applications 514 hosted on the server 500. As may be seen in FIG. 5, the virtualization Layer 508 may be extended to encompass the functionality of the battery virtualization layer 402 and so present an abstraction of the physical battery 100 to the Application Platform 504. The specific details of this abstraction may depend on the specific requirements of applications 514 being hosted by the Application platform 504, but in general terms will be designed to facilitate instantiation and management of a respective virtual battery for each VM 516.

As may be appreciated, the role of the virtualization manager 510 within the server 500 is roughly analogous to that of the runtime environment 310 of a UE 300, in that the virtualization manager 510 supports a flexible and efficient multi-tenancy run-time and hosting environment for applications 514. In operation, the virtualization manager 510 may provide a security and resource "sandbox" for each application being hosted by the platform 504. Each "sandbox" may be implemented as a Virtual Machine (VM) 516 that may include an appropriate operating system and controlled access to (virtualized) hardware resources 506 of the server 500. In accordance with the present invention, this functionality may be extended to implement a respective virtual battery for each VM 516, and thereby providing access to the (virtualized) battery 100. Similarly, the application platform services 512 may be extended to provide virtual battery manager (vBM) functions 526 as a middleware infrastructure service to the applications 514 hosted on the application platform 504.

With the arrangement of FIG. 5, the application platform 504 may extend the concept of Infrastructure as a Service (IaaS) to include Battery as a Service (BaaS), in which access to battery capacity (for example to implement an Uninterruptable Power Supply in respect of one or more applications 514) may be offered as a service of the application platform 504, for which customers may be charged.

In the foregoing description, example embodiments of the present invention have been described with reference to a condition in which the energy stored in the battery 100 is being depleted. As noted above, this condition may be indicated by a positive value of a total current draw from the battery 100. Conversely, a condition in which the energy stored in the battery 100 is being increased may be indicated by a negative value of the total current draw from the battery 100. When the battery 100 is being charged, the battery manager 318 may interact with each vBM 404 to increase the respective virtual battery reserve of each virtual battery 406, up to the total virtual capacity allocated to the virtual battery 406. If desired, the respective virtual battery reserve of each virtual battery 406 may increase equally across all of the VMs 316, or in proportion to their virtual capacity, which implies an equitable sharing of recharge energy being stored in the physical battery 100. Alternatively, the respective virtual battery reserve of each virtual battery 406 may increase in a defined order. For example, the respective virtual battery reserve of a virtual battery 406 associated with a high priority VM 316 (or high priority applications 312) may be increased first. In such a case, the respective virtual battery reserve of a virtual battery 406 associated with a low priority VM 316 (or low priority applications 312) may not be increased until high priority virtual batteries 406 are at full capacity.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of controlling a computing device including a physical battery and configured to support execution of a plurality of groups of applications, each group of applications including one or more applications executable on hardware resources of the computing device, the method comprising:
   executing each of the plurality of groups of applications using a different respective slice of the computing device, each slice associated with a respective virtual battery;
   controlling each group of applications based on a state of the virtual battery associated with the slice of the computing device within which the group of applications is executed, each virtual battery having a respective virtual capacity being a defined portion of a capacity of the physical battery and a respective virtual battery reserve less than or equal to the virtual capacity and representing an amount of energy that is available for use by the group of applications associated with the virtual battery, the capacity of the physical battery representing a maximum amount of energy that can be stored in the physical battery; and
   updating the virtual capacity of each of the virtual batteries during runtime of the group of applications associated therewith.

2. The method as claimed in claim 1, further comprising instantiating a virtual battery manager associated with each group of applications, the virtual battery manager being configured to control the respective group of applications based on the state of the respective virtual battery.

3. The method as claimed in claim 1, wherein each group of applications is executed in a respective virtual machine.

4. The method as claimed in claim 3, wherein each virtual machine is associated with a virtual battery manager configured to control the respective group of applications based on the state of the respective virtual battery.

5. The method as claimed in claim 1, wherein the virtual capacity of a given virtual battery is calculated based on any one or more of:
   an estimated battery utilization of the respective group of applications;
   a priority of the respective group of applications; and
   a user input.

6. The method as claimed in claim 1, wherein the updated virtual capacity is calculated based on an actual battery utilization of the respective group of applications.

7. The method as claimed in claim 1, wherein controlling each group of applications based on a state of the respective virtual battery comprises:
   detecting a low-battery state of a particular virtual battery, and in response to detection of the low battery state, performing any one or more of:
   shutting down one or more applications of the respective group of applications associated with the particular virtual battery; and restricting access, by one or more applications of the respective group of applications associated with the particular virtual battery, to hardware resources of the computing device.

8. The method as claimed in claim 7, wherein detecting the low battery state comprises:
calculating an estimate of the battery utilization of the respective group of applications; and
decreasing a value of the respective virtual battery reserve of the particular virtual battery based on the calculated estimate of the battery utilization.

9. The method as claimed in claim 8, wherein detecting the state of a particular virtual battery further comprises increasing the virtual battery reserve of the particular virtual battery when the energy currently stored in the physical battery is increasing.

10. The method as claimed in claim 9, wherein increasing the energy remaining in the particular virtual battery is based on any one or more of:
a rate at which the energy currently stored in the physical battery is increasing;
the virtual capacity of the particular virtual battery;
a priority of the respective group of applications associated with the particular virtual battery; and
a user input.

11. The method as claimed in claim 7, wherein detecting the low-battery state of the particular virtual battery comprises any one or more of:
detecting that the virtual battery reserve of the particular virtual battery is equal to or less than a predetermined threshold; and
detecting that the virtual battery reserve of the particular virtual battery is predicted to fall below the predetermined threshold within a defined future period of time.

12. The method of claim 1, wherein each group of applications is associated with a different network slice.

13. The method of claim 12, wherein each group of applications is implemented using a different virtual machine for the respective different network slice.

14. A computing device comprising:
a physical battery having a defined battery capacity;
hardware resources comprising a memory and processor;
the computing device configured to support execution of a plurality of groups of applications, resident within the memory, each group of applications including one or more applications executable on the hardware resources, each group of applications executed using a different respective slice of the computing device, each slice associated with a respective virtual battery; and
a virtual battery manager, resident within the memory and when instantiated by the processor on the hardware resources, configured to control each group of applications based on a state of the virtual battery associated with the slice of the computing device within which the group of applications is executed, each virtual battery having a respective virtual capacity being a defined portion of a capacity of the physical battery and a respective virtual battery reserve less than or equal to the virtual capacity and representing an amount of energy that is available for use by the group of applications associated with the virtual battery, the capacity of the physical battery representing a maximum amount of energy that can be stored in the physical battery, the virtual battery manager further configured to update the virtual capacity of each of the virtual batteries during runtime of the group of applications associated therewith.

15. The computing device as claimed in claim 14, wherein each group of applications is executed in a respective virtual machine.

16. The computing device as claimed in claim 15, wherein each virtual machine is associated with a virtual battery manager configured to control the respective group of applications based on the state of the respective virtual battery.

17. The computing device as claimed in claim 14, wherein the virtual capacity of a given virtual battery is calculated based on any one or more of:
an estimated battery utilization of the respective group of applications;
a priority of the respective group of applications; and
a user input.

18. The computing device as claimed in claim 14, wherein the virtual battery manager is configured to control each group of applications by:
detecting a low-battery state of the respective virtual battery, and in response to detection of the low battery state, performing any one or more of:
shutting down one or more applications of the respective group of applications associated with the virtual battery; and
restricting access, by one or more applications of the respective group of applications associated with the virtual battery, to the hardware resources.

19. The computing device as claimed in claim 18, wherein detecting the low battery state comprises:
calculating an estimate of the battery utilization of the respective group of applications; and
decreasing a value of the respective virtual battery reserve of the particular virtual battery based on the calculated estimate of the battery utilization.

20. The computing device as claimed in claim 19, wherein detecting the state of the respective virtual battery further comprises increasing the virtual battery reserve of the respective virtual battery when the energy currently stored in the physical battery is increasing.

21. The computing device as claimed in claim 20, wherein increasing the virtual battery reserve of the respective virtual battery is based on any one or more of:
a rate at which the energy currently stored in the physical battery is increasing;
the virtual capacity of the respective virtual battery;
a priority of the respective group of applications associated with the respective virtual battery; and
a user input.

22. The computing device as claimed in claim 18, wherein detecting a low-battery state of the respective virtual battery comprises any one or more of:
detecting that the virtual battery reserve of the respective virtual battery is equal to or less than a predetermined threshold; and
detecting that the virtual battery reserve of the respective virtual battery is predicted to fall below the predetermined threshold within a defined future period of time.

23. The computing device of claim 14, wherein each group of applications is associated with a different network slice.

24. The computing device of claim 23, wherein each group of applications is implemented using a different virtual machine for the respective different network slice.

* * * * *